US006233350B1

United States Patent
Mehrotra et al.

(10) Patent No.: US 6,233,350 B1
(45) Date of Patent: May 15, 2001

(54) APPARATUS FOR VIEWING AND INSPECTING A SURFACE AREA OF AN OBJECT

(75) Inventors: Yogesh Mehrotra, Monroe, CT (US); John Nazarian Pike, Pleasantville, NY (US)

(73) Assignee: Materials Technologies Corporation, Monroe, CT (US)

( * ) Notice: Subject to any disclaimer, the term of this patent is extended or adjusted under 35 U.S.C. 154(b) by 0 days.

(21) Appl. No.: 09/262,783

(22) Filed: Mar. 4, 1999

(51) Int. Cl.[7] .................................................. G06K 9/00
(52) U.S. Cl. .............................................. 382/141; 348/82
(58) Field of Search ...................................... 382/141, 149, 382/128; 348/65, 66, 68, 73, 74, 76, 82–85

(56) References Cited

U.S. PATENT DOCUMENTS

| | | |
|---|---|---|
| 3,647,961 | 3/1972 | Blitchington, Jr. et al. . |
| 4,616,257 | 10/1986 | Kloots et al. . |
| 5,046,163 | 9/1991 | Priest et al. . |
| 5,068,720 | 11/1991 | Herlitz et al. . |
| 5,293,242 | 3/1994 | Mamiya . |
| 5,386,293 | 1/1995 | Barnard et al. . |
| 5,527,261 | 6/1996 | Monroe et al. . |
| 5,635,697 | 6/1997 | Shellhammer et al. . |
| 5,678,091 | 10/1997 | Daspit . |
| 5,691,840 | 11/1997 | Bae et al. . |
| 5,712,677 | 1/1998 | Fraering, Jr. et al. . |
| 5,729,283 | 3/1998 | Meyer et al. . |
| 5,745,165 | 4/1998 | Atsuta et al. . |
| 5,754,220 | 5/1998 | Smalser, Sr. . |
| 5,960,105 * | 9/1999 | Brethour .............................. 382/141 |
| 5,963,660 * | 10/1999 | Koontz et al. ........................ 382/141 |
| 6,002,792 * | 12/1999 | Oguri et al. .......................... 382/149 |
| 6,002,993 * | 12/1999 | Naito et al. ............................. 348/83 |
| 6,005,959 * | 12/1999 | Mohan et al. ........................ 382/141 |
| 6,052,478 * | 4/2000 | Wihl et al. ............................ 382/149 |

OTHER PUBLICATIONS

1998, "Excerpt from Edmund Scientific Company Catalog".
Laser Focus World Magazine, Sep. 1998, "Optical design is key to machine–vision systems".

* cited by examiner

*Primary Examiner*—Joseph Mancuso
(74) *Attorney, Agent, or Firm*—Cummings & Lockwood

(57) ABSTRACT

An apparatus for viewing and inspecting the surface area of an object, including a probe having a viewing window defining a field of view, and an image-forming lens within the probe. The probe also includes an image detector on an opposite side of the image-forming lens relative to the viewing window for receiving a viewed image of the surface area through the lens, and transmitting electrical signals indicative thereof. At least one of a focal length of the lens, a primary object distance between the lens and a primary target plane wherein image resolution is optimal, and a primary image distance between the lens and the detector, is selected to: (i) form the primary target plane at approximately the viewing window of the probe; (ii) focus approximately the entire field of view onto the image detector; and (iii) define a depth of the field of view at least approximately equal to a height of the field of view. At least one light source is mounted within the probe between the viewing window and the image-receiving lens. The apparatus also includes an image display remotely mounted relative to the hand-held probe and coupled to the image detector for receiving the image signals transmitted by the detector and generating an enlarged image of the viewed surface area on the display.

21 Claims, 6 Drawing Sheets

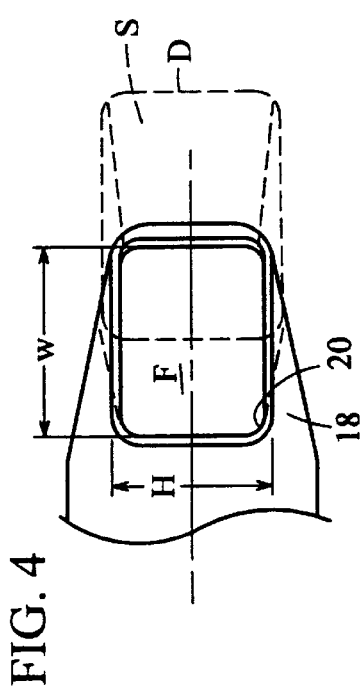
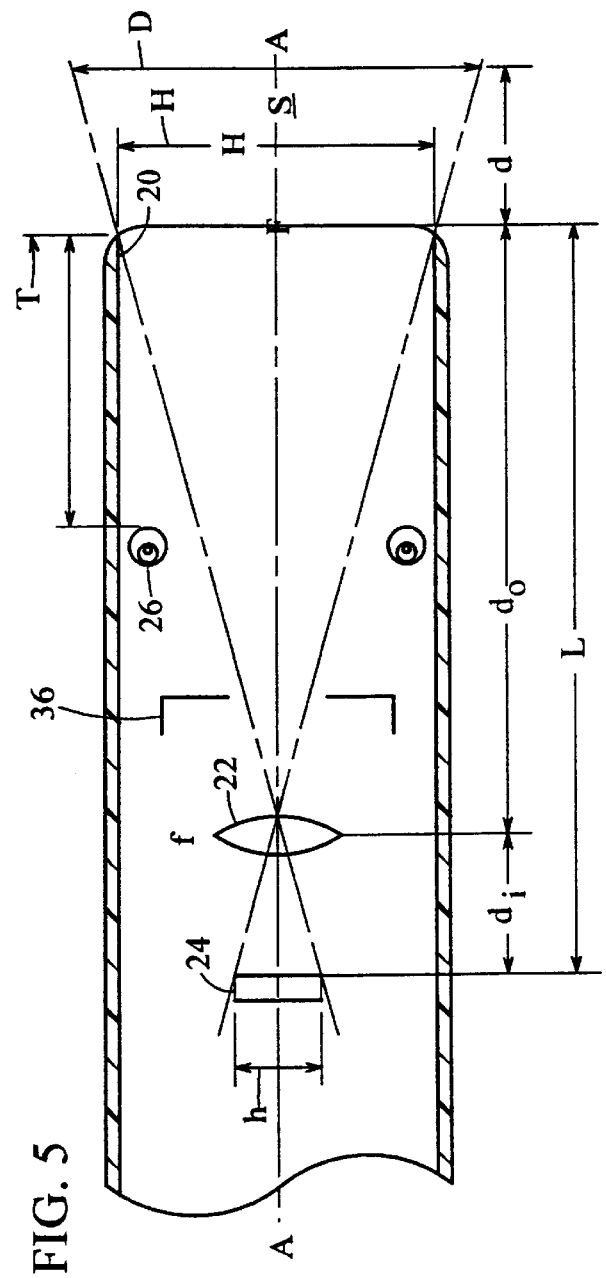
FIG. 4
FIG. 5

APPARATUS FOR VIEWING AND INSPECTING A SURFACE AREA OF AN OBJECT

BACKGROUND

The present disclosure relates, in general, to an apparatus for viewing and inspecting a surface area of a three dimensional object, such as a cylinder, square or elliptical wire or cable having an insulative coating or polymeric outer layer. Even more particularly, the present disclosure relates to a hand-held probe, employing a miniature video camera and a light source, and connected to a remote video monitor for viewing and inspecting a surface area of an object.

Inspecting surfaces of three dimensional objects is important in many industries and fields. For example, in the aircraft industry, electrical and control wires and cables must be inspected on a regular basis for the detection of anomalies, flaws or imperfections in the surface of the wires or cables (such as stress cracks and abrasion chipping in the polymeric coatings or insulative layers of the wires and cables), which could lead to an unsafe condition. These inspections are normally performed by an inspector using a light and unaided eyes.

What is desired, however, is an apparatus and method for augmenting and assisting manual inspection procedures by providing lighting, image enlargement and recording capability. Preferably, the apparatus will include a hand-held imaging probe, a real-time image display, an image recorder, and a compact battery pack. The hand-held imaging probe will preferably be relatively small and lightweight, so that the probe can be placed anywhere or pushed up against anything an inspector would normally touch, or would point to within or just beyond arm's length. In addition, the probe will preferably be simple and inexpensive in design, and rugged and durable such that it can withstand rough handling during an inspection process without being damaged.

SUMMARY

Accordingly, the present disclosure provides an apparatus for viewing the surface area of an object and inspecting the surface area for anomalies, flaws or imperfections. The apparatus includes an imaging probe and an image display. The probe has a viewing window defining a field of view, and an image-forming lens within the probe defining an optical axis extending through the viewing window. An image detector is mounted within the probe on an opposite side of the image-forming lens relative to the viewing window for receiving through the image-forming lens a viewed image of the surface area of the object and transmitting electrical signals indicative of the viewed image to the image display.

The image-forming lens and the image detector define a primary object distance between the lens and a primary target plane wherein image resolution is best, and a primary image distance between the lens and the detector. At least one of a focal length of the lens, the primary object distance, and the primary image distance is selected to: (i) form the primary target plane at approximately the viewing window of the probe to thereby generate a relatively high resolution image of a surface area located at the aperture; (ii) focus approximately the entire field of view onto the image detector, such that the entire field of view will be transmitted to the image display; and (iii) provide a depth of field of view at least approximately equal to a height of the window and, in turn, define a viewing space in front of the window wherein a surface area located anywhere within the viewing space can be viewed and inspected.

The imaging probe also includes at least one light source between the viewing window and the image-forming lens for approximately uniformly illuminating the field of view. The image display is remotely mounted relative to the imaging probe and coupled to the image detector of the probe for receiving the image signals transmitted by the detector. The image display is adapted to provide an enlarged image of the viewed surface area.

BRIEF DESCRIPTION OF THE DRAWINGS

So that those having ordinary skill in the art to which this disclosure pertains will more readily understand how to construct an apparatus for viewing and inspecting in accordance with this disclosure, the apparatus will be described in detail herein below with reference to the drawings wherein:

FIG. 4 shows a front isometric view of a portion of the imaging probe of FIG. 1;

FIG. 5 shows a schematic representation of a front portion of the imaging probe of FIG. 1.

DETAILED DESCRIPTION

Figure 1:
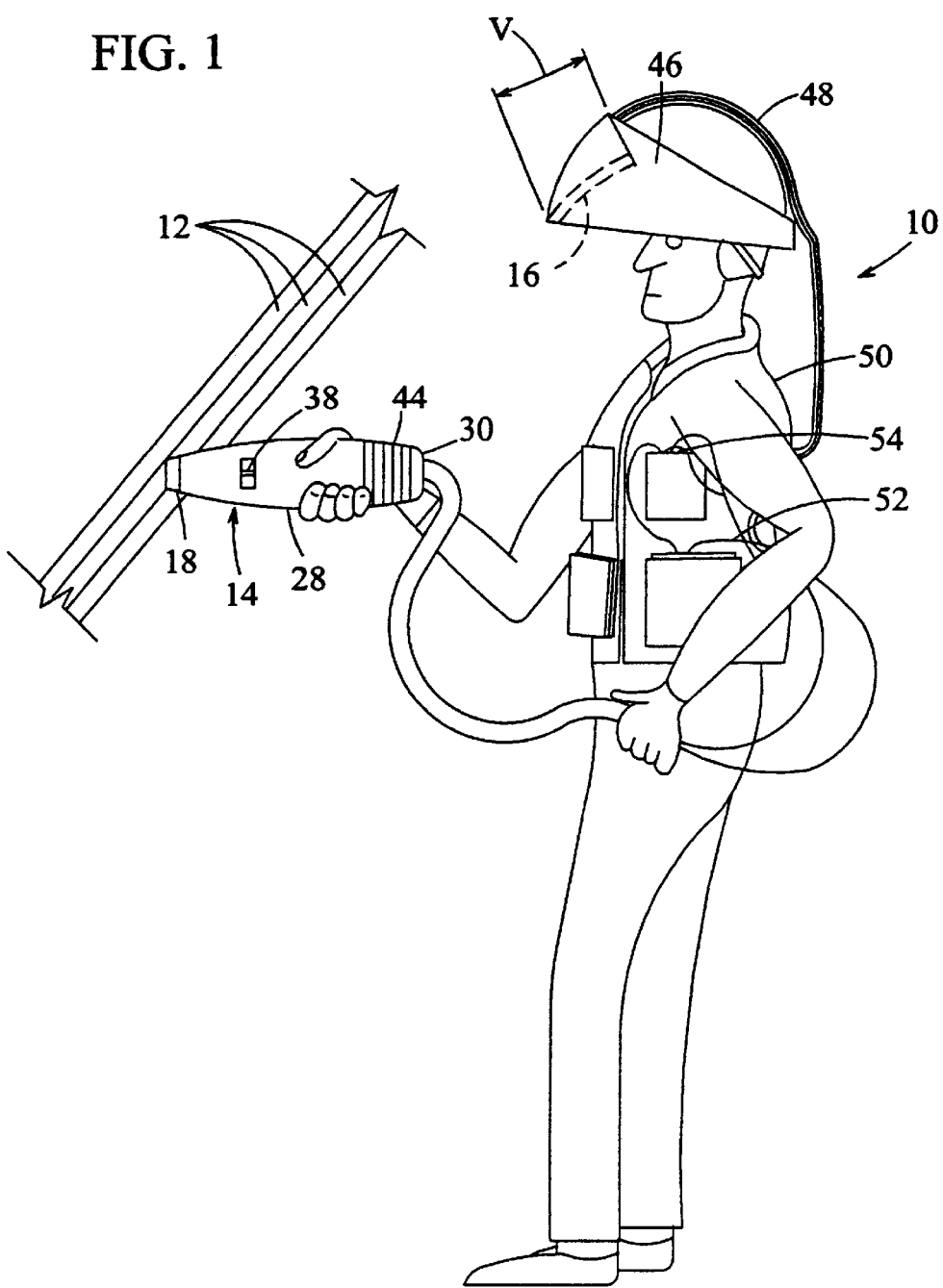
FIG. 1 shows a side perspective view of an inspector using an apparatus and method for viewing and inspecting, including a hand-held imaging probe according to the present disclosure.
Figure 2:
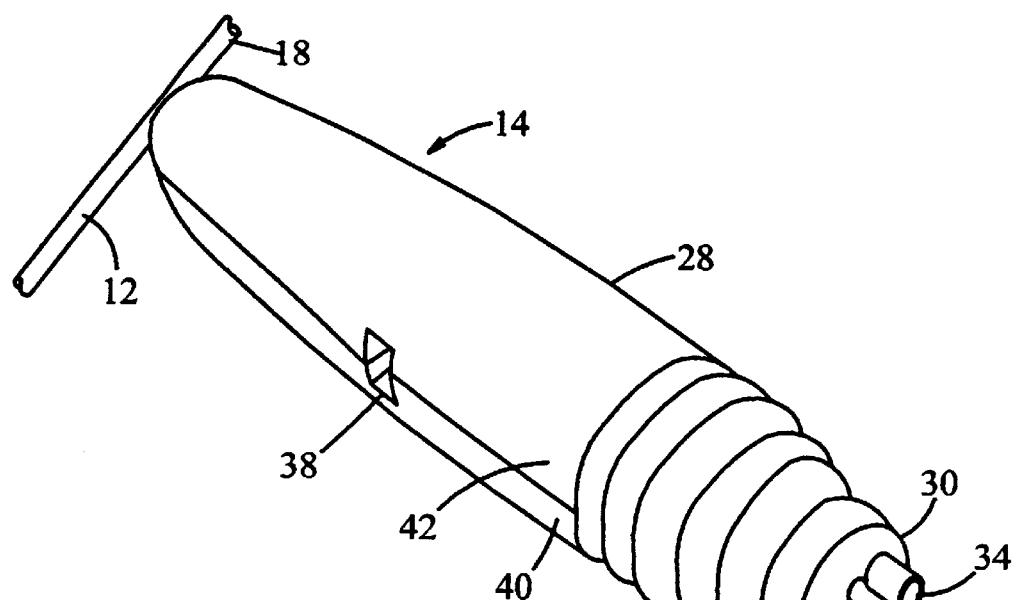
FIG. 2 shows a rear isometric view of the imaging probe of FIG. 1.
Figure 3:
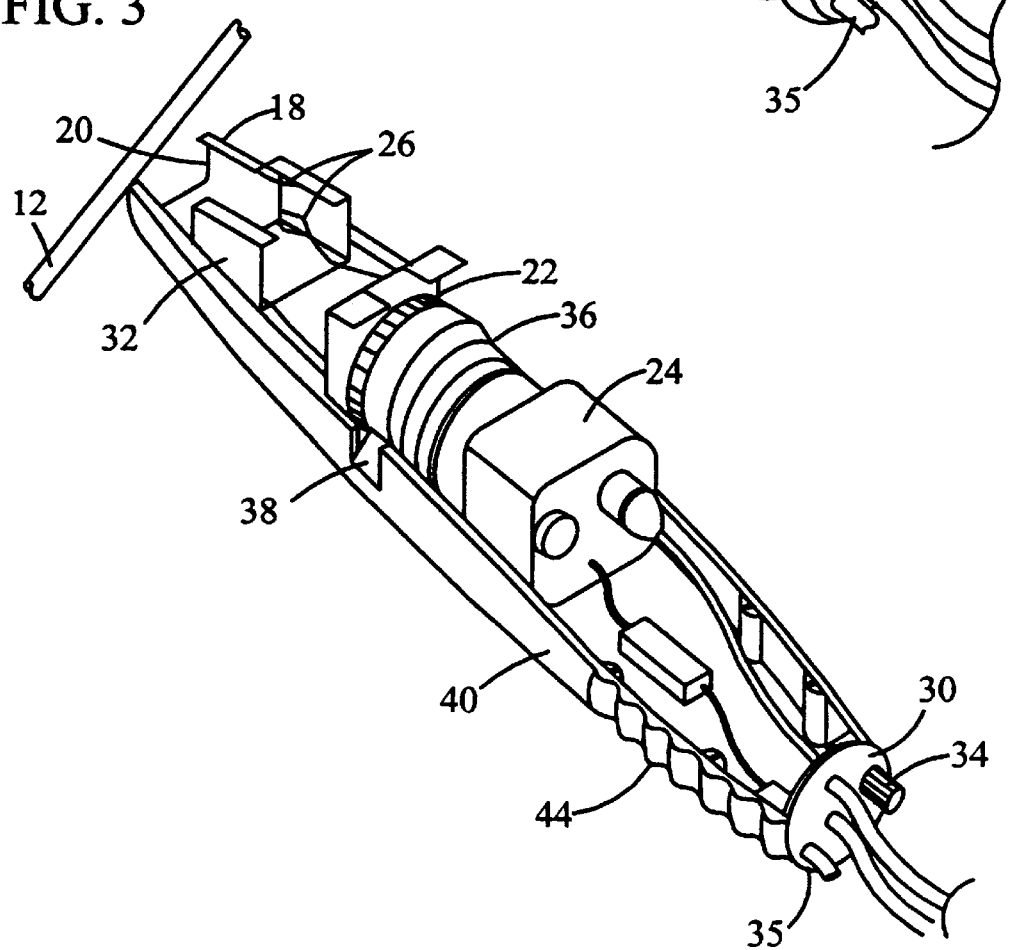
FIG. 3 shows a rear isometric view of the imaging probe of FIG. 1 with a top body portion removed to reveal the interior of the probe.

Referring to FIG. 1, an apparatus 10, according to the present disclosure, for viewing the surface area of an object, such as cable and wires, and inspecting the surface area for anomalies, flaws or imperfections, is shown. The apparatus 10 includes a hand-held imaging probe 14 and an image display 16 remotely positioned relative to the probe 14 and coupled to the probe 14 for receiving image signals transmitted by the probe 14 and generating an enlarged image.

Referring to FIGS. 2–5, the hand-held imaging probe 14 includes a first end 18 having a viewing window 20 defining a field of view F, an image-forming lens 22 mounted within the probe 14 and defining an optical axis A—A extending through the viewing window 20, and an image detector 24 mounted within the probe 14 on an opposite side of the image-forming lens 22 relative to the viewing window 20, and in alignment with the optical axis A—A. The image detector 24 receives a viewed image of the surface area of an object through the image-forming lens 22 and transmits electrical signals indicative of the viewed image.

The image-forming lens 22 and the image detector 24 define a primary object distance $d_0$ between the lens 22 and a primary target plane T wherein image resolution is best, and a primary image distance $d_i$ between the lens 22 and the detector 24. At least one of a focal length $f$ of the lens 22, the primary object distance $d_0$, and the primary image distance $d_i$, is selected to: (i) form the primary target plane T at approximately the viewing window 20 of the probe 14 to thereby generate a relatively high resolution image of a viewed surface area located at approximately the window 20; (ii) focus approximately the entire field of view F onto the image detector 24 such that approximately the entire field of view F is transmitted by the image detector 24; and (iii) provide a depth d of the field of view F at least approximately equal to a height H of the window 20, such that a viewing space S in front of the window 20 results wherein a surface area located anywhere within the viewing space S can be viewed and inspected. The probe 14 also includes at least one light source 26 between the viewing window 20 and the image-forming lens 22 for approximately uniformly illuminating the field of view F.

The geometry of the front end of the hand-held probe 14 is shown isometrically in FIG. 4 and schematically in FIG. 5. In the presently shown embodiment, a body 28 of the probe 14 and the viewing window 20 have a rectangular cross-section. It should be understood, however, that the body 28 of the probe 14 and the viewing window 20 could alternatively have other cross-sectional shapes, such as circular. The viewing window 20 has a height H and, although not shown, a width W equal to one and a third times the height H, i.e. W=1.33H. The focal length $f$ of the image-forming lens 22 is fixed, and focuses the height H of the viewing window 20 to exactly fill the corresponding dimension, i.e. the height h, of the image detector 24, such that a point object anywhere in the window 20 will generally be represented by its point conjugate image on the surface of the detector 24. Accordingly, images of objects positioned at the plane of the window 20 will have optimum resolution of fine detail, limited by the larger of pixel size or diffraction blurring.

It is preferable that the probe 14 have an overall length of no more than 400 mm (16 inches), for ease of use. From conventional lens optics (thin lens approximation), specifying fixed values of focal length $f$ of the image-forming lens 22, the height H of the viewing window 20, and the corresponding dimension h of the image detector 24 implies that the primary object and the primary image distances $d_0$ and $d_i$ are also fixed parameters of the system. By similar triangles, $d_0$ and $d_i$ are related through the ratio $d_i/d_0$=h/H. An optical length L of the probe 14, i.e. the portion of the probe 14 between the image detector 24 and the viewing window 20, is just the sum of $d_0$ and $d_i$. The optical length L is easily shown to be L=$f$·[2+(H/h)+(h/H)], which increases as both $f$ and H/h increase. Since electronic components within the probe 14, located between a second end 30 of the probe 14 and the image detector 24 in FIG. 3 can, in practice, be held to occupy a length of about 150 mm (6 inches), it is preferable that the optical length L be held to a practical range of 100 to 250 mm (4 to 10 inches). For example, if H=25.2 mm, and h=3.6 mm (typical of an image detector 24 comprising a ⅓" CCD, for example), any lens 22 with a focal length $f$ between 11 and 27 mm could be used in the probe 14. Preferably, the window 20 has a height H equal to between about one and two inches, and most preferably about one inch.

The depth d of the field of view F from the viewing window 20 is represented in FIGS. 4 and 5 by the imaginary plane D. Any inspected object in the viewing space S, defined in part by the width W and the height H of the window 20, and the depth d of the field of view F, will be seen with relatively sharp resolution by the image detector 24, but will appear reduced in size in proportion to its distance from the window 20, due to perspective. It has been found that a simple but satisfactory definition of the depth d of the field of view F is a distance from the window 20 at which a point object on the plane D, when imaged by the image-forming lens 22, produces a geometrical (not diffractive) blur of width equal to three pixels on the CCD array. Preferably, the depth d of the field of view F and the height H of the viewing window 20 are approximately equal, i.e. most preferably equal to about one inch.

Approximately uniform illumination of the viewing window 20 is provided by four lamps 26 mounted on a lampholder frame 32 secured to the body 28 of the probe 14 adjacent the viewing window 20. The lamps 26 are positioned to direct illumination forward through the window 20 and into the field of view F of the lens 22 assembly, and are spaced from the window 20 approximately a distance l equal to the height H of the window 20, so that the lamps are geometrically outside the field of view F of the image detector 24. The lamps are sized such that the light level at the plane D will be approximately one quarter (¼) of that at the window 20, thereby providing sufficient uniform illumination of the entire viewing space S seen by the instrument. The lamps 26 are preferably, but not limited to, 2.5 volt miniature, unfocused, bi-pin tungsten lamps. The intensity of the lamps are controlled by a dimmer switch 34, which is located at the second end 30 of the probe 14 adjacent an on/off power toggle switch 35 that controls power to the lamps and the camera.

The diagram of FIGS. 4 and 5 makes clear that since the image-forming lens 22 fills the image detector 24 with the viewing window 20 of height H, and the image detector 24 fills the image display 16 of height V (by electronic design), then the overall enlargement factor of the system is V/H. Specifically, the inspector, when looking at some small object located at the viewing window 20, will see that same object enlarged V/H times on the image display 16. For example, the image signal from the probe 14 having a viewing window 20 with a height H of one inch, when viewed on an image display 16 that has a screen height V of twelve inches, will in effect be enlarged twelve times. Under these circumstances, a two millimeter diameter insulated wire positioned at the viewing window 20, will appear to the inspector to be twenty-four millimeters in diameter when viewed on the image display 16. For a fixed-optics probe 14, the resolution of detail in this image will be no worse than what an ideal standard eye would see under ideal viewing circumstances.

Preferably, the image forming lens 22 is a single objective lens having an aspheric surface for aberration correction, and is provided with a focal length $f$ of 16 mm. In addition, the image forming lens 22 is provided with an adjustable iris diameter in the form of a manual aperture adjustment ring 36, for the final light sensitivity adjustment of the image detector 24. Although not shown, the aperture adjustment ring 36 comprises aperture blades which can be manually opened and closed, using an aperture lever 38 extending out of the body 28 of the probe 14, to change the size of an aperture positioned between the lens 22 and the viewing window 20. Such an aperture blade mechanism can be implemented by the known art, and, therefore, the description thereof is omitted.

When the viewing window 20 of the probe 14 is pulled away from an object, the lens aperture 36 can be decreased to increase the depth d of field of view F. The resulting insufficiency of brightness due to the decreased size of the aperture is supplemented by manually increasing the illumination from the lamps 26, by use of the dimmer switch 34. When the viewing window 20 of the probe 14 is pushed against an object, the lens aperture 36 can be increased to increase the brightness, and decrease the depth d of field. Adjusting the aperture size may be readily performed by merely moving the aperture lever 38.

The image detector 24 preferably comprises a self-contained, solid state video camera having a high resolution CCD with an array of 510×492 picture elements or better and a format of ⅔" or ½", such as Water Series 200 video camera available from Watec America, Las Vegas, Nev. The camera also has image processing circuitry that converts raw video information from its CCD array into a monitor ready standard format signal suitable for the image display 16, such as a standard NTSC, PAL, or Secam color video signal. The camera is preferably powered by 12 Vdc and includes an internal voltage regulation, and a standard video connector.

Although not shown, to protect the lamps 26, the lens 22 and the camera 24, the probe 14 can be provided with an optically transparent cover over or adjacent the viewing window 20, perpendicular to the optic axis A—A. Direct mirror reflections of the lamps 26 may be seen by the image detector 24 unless the transparent cover is placed very close to the lamps themselves, or provided with an anti-reflection coating on both sides. The body 28 of the probe 14 includes two pieces 40, 42 secured together with screws. The body 28 is made of a durable and corrosion resistant material, such as plastic. It should be noted, that the probe 14 can easily be provided with a water-tight body 28 if desired. A rear portion of the body 28 defines a contoured hand grip 44.

Referring back to FIG. 1, the image display 16 is preferably mounted in a visor 46 of a helmet 48, such that an inspector can simply glance up to view the display 16. The display 16 is only about one inch in height, but provides a virtual image of a twelve inch screen and therefore provides a enlargement of twelve for a viewing window 20 with a height H of one inch. In addition to the display 16 and the probe 14, the apparatus 10 for viewing and inspecting includes a vest 50 for carrying the battery pack 52, and an image recorder 54 also carried in the vest. A first cable carries a processed standard format video signal from the camera 24 to the image recorder 54, while a second cable carries the signal from the recorder to the image display 16. The battery pack 52 provides power to the lamps and the camera in the probe 14, and to the display 16 and the recorder 54 through cables. A suitable vest 50 and battery pack 52 can be obtained from NGR Research, Inc. of Grands Pass, Oreg., while the recorder 54 is a Sony GV-A500 micro hi-8 mm video recorder, and the helmut 48 with video display 16 is available from Optics1, Inc. of West Lake, Calif., as model no. PT-01.

Thus, an apparatus 10 for augmenting and assisting manual inspection procedures by providing lighting, image enlargement and recording capability is provided by the present disclosure. The basic optical design of the apparatus 10 provides a field of view F, wherein the entire field of view F is enlarged and displayed on a video display 16. The apparatus 10 provides adequate resolution of detail of the surface area of the object, when the surface area is located at the probe face 18, so that the smallest detail that the visual inspection procedure requires is seen on the video display 16. A depth d of field, measured from the probe face 18 to the far point, where target detail resolution drops to about half that at best focus, of 1" or larger is provided, to insure that within a volume of at least 1.3 cubic inches in front of the probe 14, no necessary detail will escape the attention of the inspector, assuming a window height H=1", and a window width W=1.33". An overall apparent enlargement of the target, as seen by the inspector, of the order of 6X–12X is also provided, along with uniform aillumination of the entire volume, while maintaining the probe 14 length between 10" and 16", for ease of handling in practical situations. The probe 14 can be placed anywhere or pushed up against anything an inspector would normally touch, or would point to within or just beyond arm's length. In addition, the probe 14 is simple and inexpensive in design, and rugged and durable such that it can withstand rough handling during an inspection process without being damaged.

Figure 6:
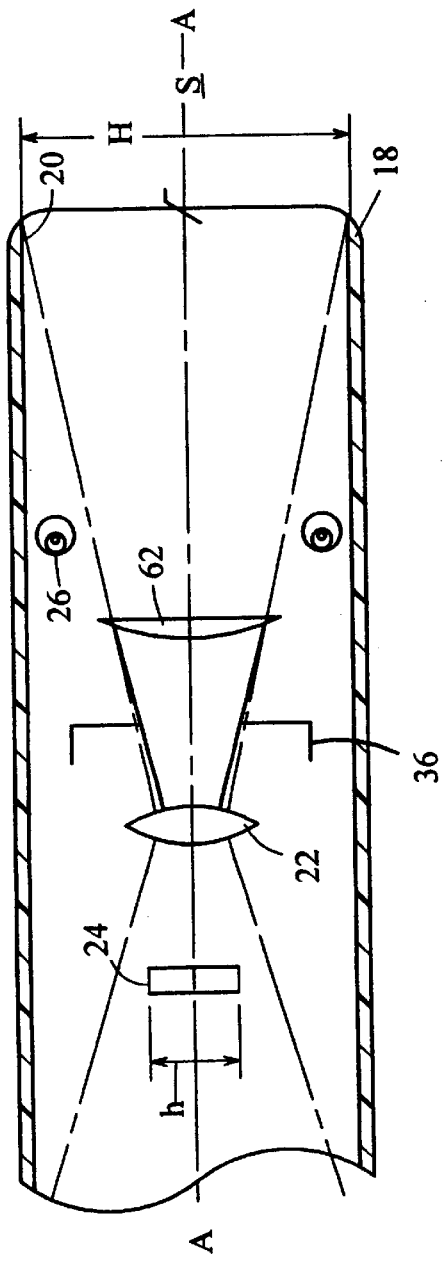
FIG. 6 shows a schematic representation of a front portion of an additional imaging probe according to the present disclosure.

Referring to FIG. 6, another hand-held probe 60 for use as part of the apparatus 10 of FIG. 1 is shown. The probe 60 is similar to the probe 14 of FIGS. 2 through 5, and elements that are the same have the same reference numerals. The probe 60 additionally includes an auxiliary negative lens 62 for providing a magnified view of the central region of the field of view F, when the inspector desires such magnification. The small, negative (e.g., plano concave corrector) lens 62 is normally stored in front of the image-forming lens 22, off to one side of the system's optic axis A—A so as to not interfere in any way with the basic optics of the instrument. When a user, or inspector, chooses to see the central area of the viewing field F at a fixed higher magnification, the inspector can cause the auxiliary negative lens 62 to be moved into proper position, i.e. alignment, on the optic axis A—A of the system, by moving a lever, for example. The probe 60 would be adapted such that the image-forming lens 22 is moved forward by the same lever along the optic axis to meet the auxiliary negative lens 62. The distance between the image forming lens 22 and the negative lens 62 is dependent on the choice of fixed magnification desired in the system. The combined lens 22, 62, with overall increased focal length, can no longer image the full field of view F onto the image detector 24, but instead produce a magnified image of some smaller centrally located area of the field of view F on the image detector. The small axial area then completely fills the video display 16 seen by the inspector. This lens combination has a much reduced depth d of field, so only sees objects sharply when they are located very close to the window 20.

Alternatively, the fixed image-forming lens 22 can be replaced with a zoom lens. The zoom lens can be utilized to zoom to a longer focal length and smaller viewed area in the center of the field of view F, or some region slightly beyond the window 20. Preferably the zoom lens has a default setting to image the full field of view F onto the image detector 24.

Figure 7:
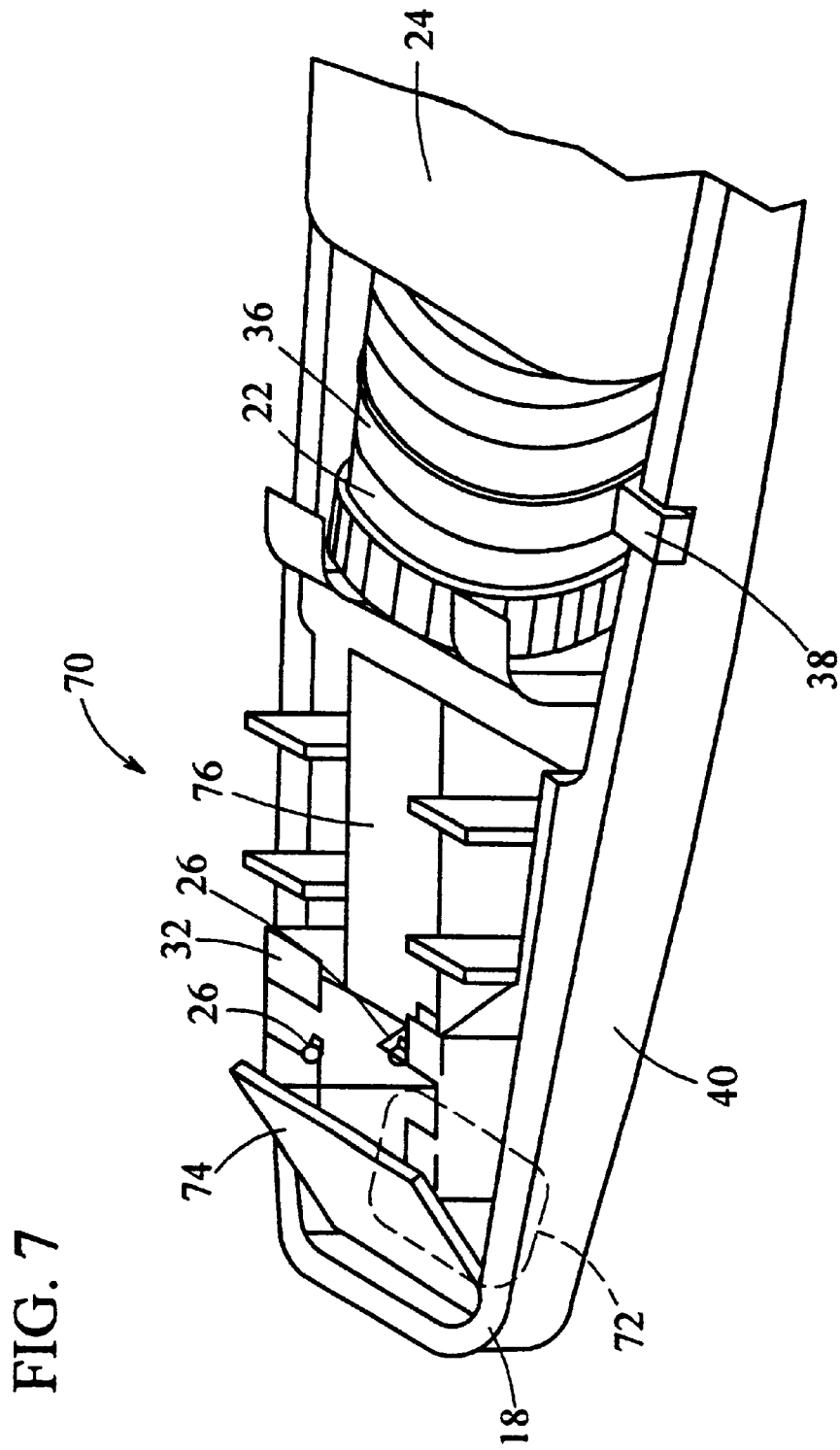
FIG. 7 is a perspective view of another embodiment of a hand held probe having one piece of the body removed and which may be employed with the apparatus of FIG. 1.

Referring to FIG. 7, another hand-held probe 70 for use as part of the apparatus 10 of FIG. 1 is shown. The probe 70 is similar to the probe 14 of FIGS. 2 through 5, and elements that are the same have the same reference numerals. In stead of a viewing window located at its first end, the probe 70 has a viewing window 72 formed in the bottom of the probe body 40 adjacent the first end 18 for providing a side view, i.e. a view perpendicular to the optics axis A—A of the probe. The window 72 is similar in size and shape to the window 20 of the probe 14 of FIGS. 2 through 5. This probe 70, however, is usefully for observing objects on a side of the probe when there is not enough room to orient the probe such that the probe can be pointed at the object to be inspected.

The probe 70 includes a mirror 74 mounted in front of the lamp stand 32, so that the optical axis A—A passes through the center of the mirror. The mirror is fixed at an angle of 45 degrees with respect to the optical axis A—A so that the mirror allows the camera to focus, through the window 72, on an image 90 degrees from the optical axis A—A. The mirror 74 is preferably a front surface mirror formed of thin crown glass with a reflective metal coating deposited on its front surface. The mirror is generally the same shape as the viewing window 72, e.g. square. A dove prism 76 is provided between the mirror 74 and the image-forming lens 22 to provide image erection.

Figure 8:
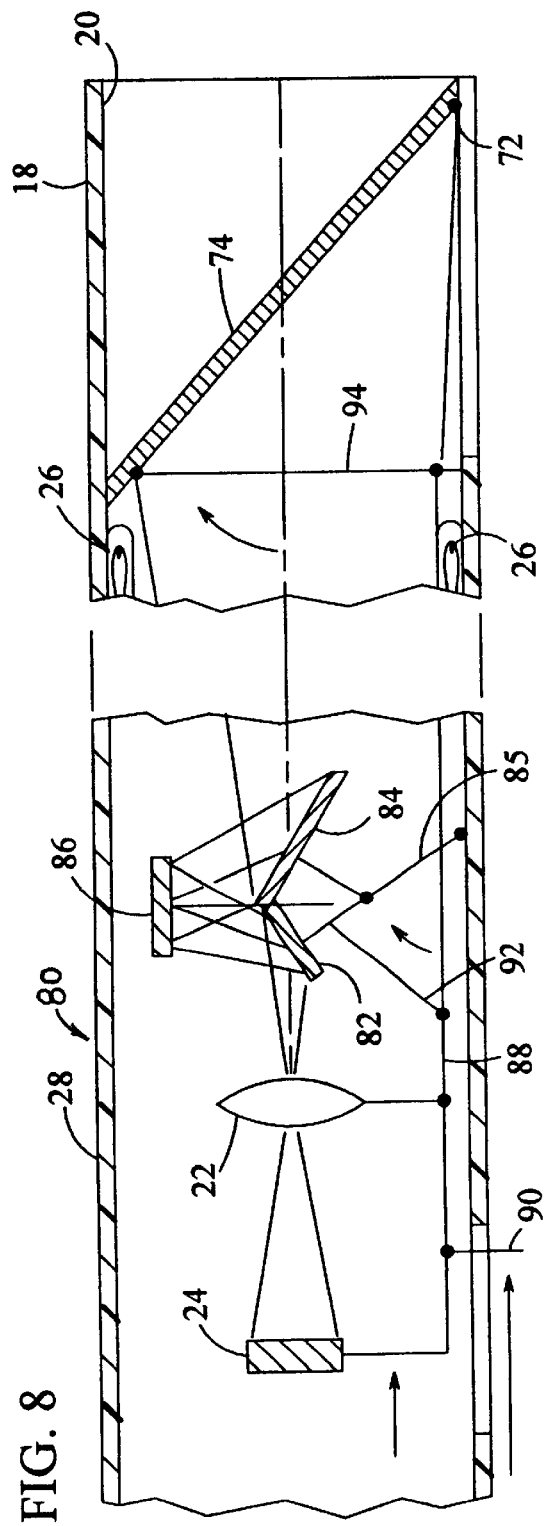
FIG. 8 is a sectional view of yet another embodiment of a hand held probe that may be employed with the apparatus of FIG. 1.

Referring to FIG. 8, another hand-held probe 80 for use as part of the apparatus 10 of FIG. 1 is shown. The probe 80 is similar to the probe 14 of FIGS. 2 through 5, and the probe 70 of FIG. 7, and elements that are the same have the same reference numerals. The probe 80 includes the forward viewing window 20, the side viewing window 72 and the mirror 74, which is pivotly mounted to open and close the side viewing window. Accordingly, the probe 80 allows a choice between forward viewing or side viewing without having to change probes when wishing to observe some object from more than one direction.

The probe 80 also includes two erecting mirrors 82, 84 fixedly mounted to a support 85, which is pivotly connected to the body 28 of the probe, such that the two erecting mirrors 82, 84 can be rotated completely out of the field of view of the image-forming lens 22. A third erecting mirror 86 is fixed in place, since it does not interfere with the field of view. In addition, the image forming lens 22 and the image detector 24 are mounted together on a sliding support 88.

When using the forward viewing window 20, the side mirror 74 and the erecting mirrors 82, 84 are rotated completely out of the way of the field of view of the image-forming ens 22. However, when side viewing is desired, the side mirror 74 and the two erecting mirrors 82, 84 are rotated into alignment with the optics axis A—A, and the sliding support 88 holding the image forming lens 22 and the image detector 24 is moved forward parallel with he optics axis.

Preferably, all these movements happen simultaneously with a single lever action. For example, a lever 90 can extend from the sliding support 88 and moved forward manually by the inspector when side viewing is preferred. The sliding support 88 is connected through a first pivoted strut 92 to the pivoted support 85 of the erecting mirrors 82, 84, and is connected to a pivoted/sliding support 94 of the side mirror 74. The forward movement of the image forming lens 22 and the image detector 24 is needed to compensate for the extra optical path length introduced by the erecting mirrors 82, 84, 86. With this compensation, the optics of the side viewing option is identical to that of the forward viewing option.

Figure 9:
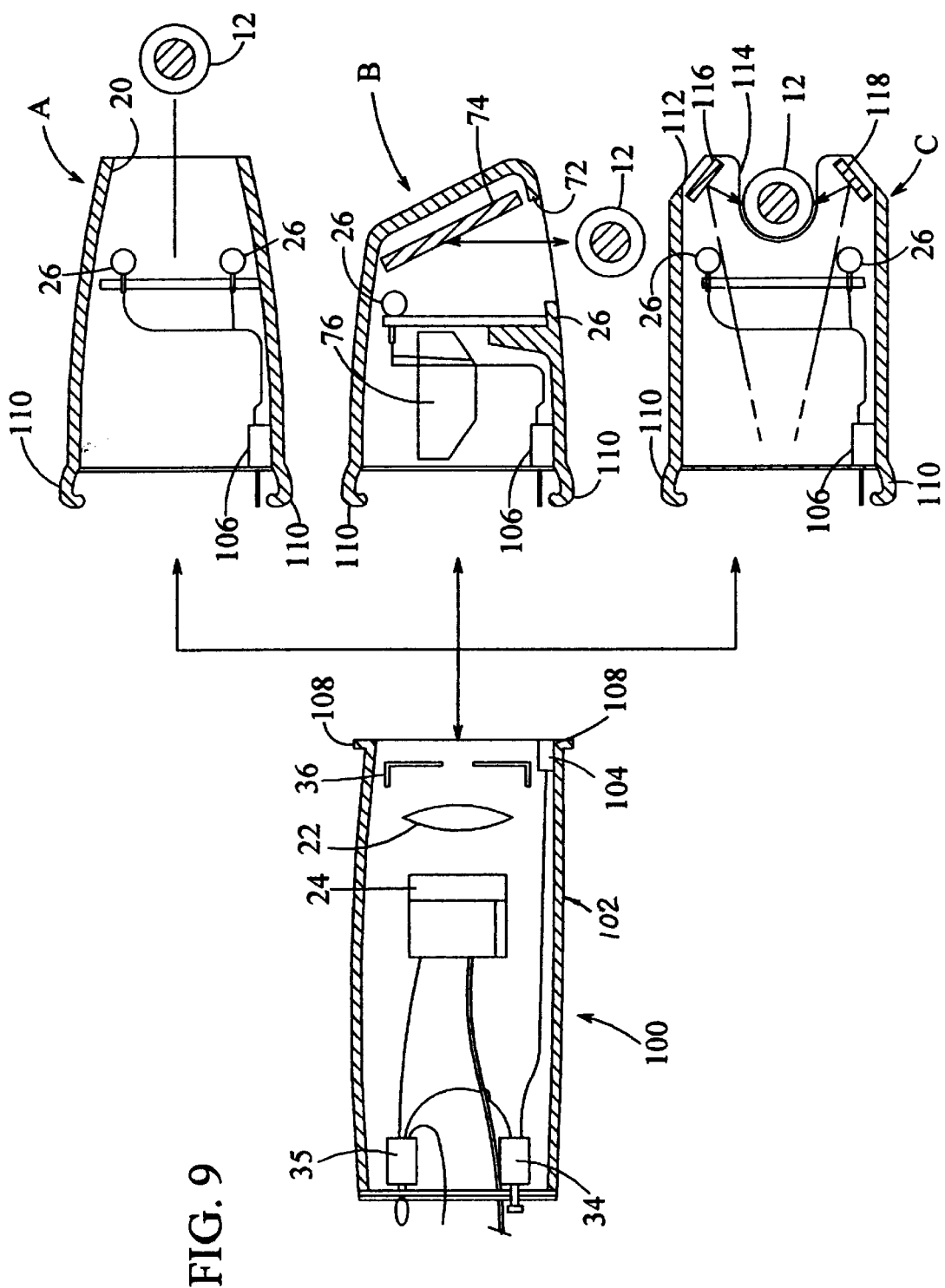
FIG. 9 is a sectional view of a further embodiment of a hand held probe that may be employed with the apparatus of FIG. 1 and which comprises three interchangeable nose pieces.

Referring to FIG. 9, another hand-held probe 100 for use as part of the apparatus 10 of FIG. 1 is shown. The probe 100 is similar to the probe 14 of FIGS. 2 through 5, and the probe 70 of FIG. 7, and elements that are the same have the same reference numerals. The probe 100 of FIG. 9, however, includes a main body 102 with three interchangeable nose pieces: a forward viewing nose-piece A; a side viewing nose-piece B; and a circumferential viewing nose-piece C.

The main body 102 carries the video camera 24, the image-forming lens 22 and the aperture ring 36. The main body 102 also includes the on/off power switch 35 and the dimmer switch 34 for controlling the level of illumination. All three nose-pieces A, B, C include the illumination lamps 26, which are detachably connected electrically to the dimmer switch 34. The lamps 26 can be detachably connected to the dimmer switch 34 using, for example, a receptacle 104 in the main body 102, and a corresponding plug 106, for mating with the receptacle, in the nose-pieces A, B, C.

The main body 102 and the nose-pieces A, B, C also include means for detachably securing the nose pieces to the main body. The means for detachably securing can include, for example, ridges 108 around the open end of the main body 102, and latches 110 around the open end of the nose-pieces A, B, C for latching onto the ridges.

The forward viewing nose-piece A includes the forward viewing window 20 similar to the probe 14 of FIGS. 2 through 5, while the side viewing nose-piece B includes the side viewing window 72, the side mirror 74 and the Dove prism 76 similar to the probe 70 of FIG. 7. The side viewing nose-piece B can alternatively include the erecting mirrors 82, 84, 86 of FIG. 8 in place of the Dove prism 76.

The circumferential viewing nose-piece C provides a 360 degree view of the wire 12 and includes a forward viewing window 112 including a recess 114 shaped to receive a wire, as shown. The circumferential viewing nose-piece C also includes two mirrors 116, 118 positioned to provide images of a "rear portion" of the wire 12 positioned in the recess 114 of the viewing window 112. A circumferential viewing apparatus is disclosed in detail in co-pending U.S. patent application Ser. No. 08/959,387, now U.S. Pat. No. 5,936, 725 which is incorporated herein by reference in its entirety.

The principles, preferred embodiments and modes of operation of the presently disclosed apparatus for viewing have been described in the foregoing specification. The presently disclosed apparatus, however, is not to be construed as limited to the particular embodiments shown, as these embodiments are regarded as illustrious rather than restrictive. Moreover, variations and changes may be made by those skilled in the art without departing from the spirit of the presently disclosed apparatus.

What is claimed is:

1. An apparatus for viewing the surface area of an object and viewing and inspecting the surface area for anomalies, flaws or imperfections, comprising:

an elongated, hand-held probe, including:

a viewing window defining a field;

an image-forming lens within the probe spaced from the viewing window, and defining an optical axis extending through the viewing window;

an image detector within the probe on an opposite side of the image-forming lens relative to the viewing window for receiving through the image-forming lens a viewed image of a surface area of an object and transmitting electrical signals indicative thereof;

wherein the image-forming lens and image detector define a primary object distance between the lens and a primary target plane wherein image resolution is optimal, and a primary image distance between the lens and the detector, and at least one of a focal length of the lens, the primary object distance, and the primary image distance, is selected to:

(i) form the primary target plane at approximately the viewing window to thereby generate a relatively high resolution image of a viewed surface area located at approximately the viewing window;

(ii) focus approximately the entire field of view onto the image detector; and (iii) define a depth of field of view at least approximately equal to a height of the field of view, wherein the depth and the height of field of view define a viewing space in front of the viewing window; and at least one light source mounted within the probe between the viewing window and the image-receiving lens for approximately uniformly illuminating said viewing space; and an image display remotely mounted relative to the hand-held probe and coupled to the image detector for receiving the signals transmitted by the detector and generating an enlarged image of the viewed surface area on the display.

2. An apparatus as defined in claim 1, wherein the image detector is a CCD array detector.

3. An apparatus as defined in claim 1, wherein the viewing window is approximately rectangular defining a width and height, and the image detector is approximately rectangular defining a width and height.

4. An apparatus as defined in claim 3, wherein the viewing window has a width equal to at least approximately 1.33 times a height of the window.

5. An apparatus as defined in claim 4, wherein the height of the window is within the range of approximately 1.0 to 2.0 inches.

6. An apparatus as defined in claim 1, wherein the depth of the field of view is at least approximately 1.0 inch.

7. An apparatus as defined in claim 1, wherein the enlarged image of the display is at least approximately 6× the field of view.

8. An apparatus as defined in claim 1, wherein the elongated probe defines an axial length selected based on (i) the focal length of the image-forming lens, and (ii) a ratio of a height of the window to a height of the image detector.

9. An apparatus as defined in claim 8, wherein the axial length of the probe is within the range of approximately 10 to 16 inches.

10. An apparatus as defined in claim 1, wherein the at least one light source is spaced inwardly of the viewing window a distance at least approximately equal to the height of the window.

11. An apparatus as defined in claim 1, wherein the focal length of the image-forming lens is fixed.

12. An apparatus as defined in claim 1, wherein the focal length of the image-forming lens is adjustable.

13. An apparatus as defined in claim 1, wherein the probe further comprises a negative lens positionable between the image forming lens and the window.

14. An apparatus as defined in claim 1, wherein the probe further comprises an adjustable aperture positioned between the image forming lens and the window.

15. An apparatus as defined in claim 1, further comprising means for mounting the remote image display on an inspector's head, and positioning the display to one side of the inspector's face to prevent the display from blocking the inspector's direct line of sight.

16. An apparatus as defined in claim 1, further comprising means for recording the image transmitted by the image detector of the probe.

17. An apparatus as defined in claim 1, further comprising a portable power source for powering the light source, the image detector, and the image display.

18. An apparatus as defined in claim 1, further comprising means for viewing images oriented approximately orthogonal to an elongated axis of the hand-held probe.

19. An apparatus as defined in claim 1, wherein the elongated, hand-held probe comprises a main body and a detachable nose-piece, and the viewing window and the at least one light source are in the nose-piece, and the image-forming lens and the image detector are in the main body.

20. An apparatus as defined in claim 1, wherein a point object in the viewing space when imaged by the image forming lens produces a geometrical blur of width not greater than a predetermined number of pixels.

21. An apparatus as defined in claim 20 wherein the predetermined number of pixels is three.

* * * * *